United States Patent Office 3,766,163
Patented Oct. 16, 1973

3,766,163
NAVY BLUE PHENYL-AZO-NAPHTHYL-AZO-m-TOLUIDINE DYES
John Blackwell, Kennett Square, Pa., and John Elton Cole, Jr., Wilmington, Del., assignors to E. I. du Pont de Nemours and Company, Wilmington, Del.
No Drawing. Filed May 19, 1970, Ser. No. 38,891
Int. Cl. C09b 31/04
U.S. Cl. 260—191             2 Claims

ABSTRACT OF THE DISCLOSURE

Navy blue disperse disazo dyes, useful for dyeing water swellable cellulosic or synthetic fibers or blends or mixtures thereof, the formula

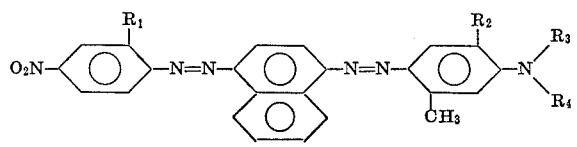

wherein $R_1$ is H, $R_5$, $OR_5$, Cl, Br, $NO_2$, CN, $CO_2R_5$, $CF_3$, $COR_5$ or $COC_6H_5$,
$R_2$ is H, $R_5$ or $OR_5$,
$R_3$ and $R_4$ each is methyl or ethyl, and
$R_5$ is alkyl of 1–4 carbon atoms.

BACKGROUND OF THE INVENTION (1) Field of the invention

This invention relates to water-insoluble navy blue disazo dyes which have utility in the dyeing of a broad spectrum of synthetic and natural materials, especially water swellable cellulosic materials, or mixtures or blends of such synthetic and natural materials.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Because of basic differences in the chemical and physical properties of the two types of materials, the components of the blend or mixture usually are dyed in complex two-stage processes employing two different types of dyes, each component being dyed independently of the other in a separate step. Cross-staining may result and the amount of dyes required usually are high, with each component undesirably interfering with the dyeing of the other. When cross-staining occurs, the dye must be capable of being scoured off the stained component. Even under optimum conditions, balance, that is, equal shade and shade strength, between the components of the blend is difficult to achieve. If the dyed fabric lacks balance, under use conditions frosting (discolored areas) will occur in the regions of maximum wear. The complexities of the aforesaid two-stage process for dyeing blends also can be appreciated from a consideration of the divergency of operating conditions between conventional dyeing processes for cellulosic and for synthetic materials. In contrast to the prior art procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. 3,313,590. Analogous to the dyeing of such blends and confirming the aforesaid distinction between water swellable cellulosic materials and nonswellable cellulose acetate, U.S. Pat. 3,153,563 discloses a two-stage process wherein the cellulose acetate is dyed with a water insoluble dye without coloring the cellulose which then is dyed in an independent step.

In order to avoid the aforesaid problems relative to the dyeing of blends or mixtures of water swellable cellulosic and synthetic materials, prior art printing operations frequently are carried out using resin bonded pigments. Since such processes provide only surface coloration, the prints obtained often exhibit crocking, poor "hand" and low fastness to washing and drycleaning.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331-337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in commonly assigned United States application Ser. No. 778,809 filed Nov. 25, 1968 and now abandoned in favor of continuation-in-part application Ser. No. 122,227 filed Mar. 8, 1971 disclose a process for dyeing water swellable cellulosic materials with disperse dyes, which process comprises contacting a water swellable cellulosic material in any sequence with the following:

(1) water in an amount sufficient to swell the cellulose;
(2) a dye in an amount sufficient to color the cellulose, a boiling saturated solution of which dye in 0.1 molar aqueous sodium carbonate exhibits an optical absorbance not in excess of about 30; and
(3) a solvent in an amount sufficient to maintain swelling of the cellulose if water is removed, and which
   (a) is at least 2.5 weight percent soluble in water at 25° C.,
   (b) boils above about 150° C. at atmospheric pressure,
   (c) is a solvent for the dye at some temperature in the range of about 0° to 225° C., and
   (d) has the formula

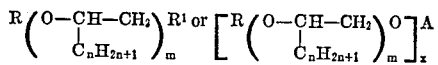

wherein $n$ is 0 or 1;
$m$ is a positive whole number;
$R$ is H, $C_{1-8}$ alkyl, $C_{7-15}$ aralkyl or alkaryl,

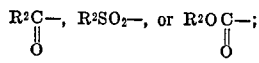

$R^1$ is —OH, $OR^2$, —$SR^2$, —$NHR^2$, —$NR^2$ ($C_{1-8}$ alkyl), $NR^2(C_{7-15}$ aralkyl or alkaryl),

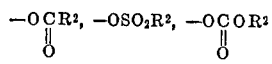

—NH(phenyl), or —NH(naphthyl);
$R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$x$ is the number of unsatisfied valencies in A; and
A is $ROCH_2CHORCH_2$—, —$CH_2CHORCH_2$—,

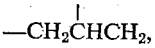

—$CH_2C(CH_2OR)_3$, —$(CH_2)_2C(CH_2OR)_2$,

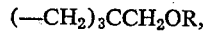

(—$CH_2)_4C$, —$CH_2(CHOR)_yCH_2OR$,

—$CH_2(CHOR)_{y-z}$(—$CH_2CH_2$— in which $y$ is 2, 3, or 4, $z$ is 0, 1, 2, 3 or 4 but not greater than $y$, and R is as above-defined;

provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

OBJECTS AND SUMMARY OF THE INVENTION

It is an object of this invention to provide navy blue disperse disazo dyes which are useful in the above-described process of Blackwell et al. for dyeing water swellable cellulosic materials and blends or mixtures thereof with synthetic materials. It is a further object to provide dyes which have good tinctorial strength, which can be isolated in highly crystalline form, and which are easily millable to finely divided aqueous dispersions. A still further object is to provide navy blue dyes which give dyeings of good balance on blends or mixtures of water swellable cellulosic materials and synthetic materials. Another object is to provide dyes which exhibit good fastness to light, washing, drycleaning and sublimation when applied to water swellable cellulosic materials, synthetic materials or blends or mixtures of such cellulosic and synthetic materials. Still another object is to provide navy blue disperse disazo dyes which are useful for dyeing synthetic materials by conventional procedures. A further object is to provide navy blue disperse disazo dyes which are useful in conjunction with other dyes in the formation of jet black shades.

The present invention resides in navy blue disperse disazo dyes of the formula

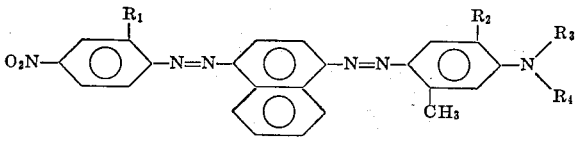

wherein $R_1$ is H, $R_5$, $OR_5$, Cl, Br, $NO_2$, CN, $CO_2R_5$, $CF_3$, $COR_5$ or $COC_6H_5$,
$R_2$ is H, $R_5$ or $OR_5$,
$R_3$ and $R_4$ each is methyl or ethyl, and
$R_5$ is alkyl of 1–4 carbon atoms.

DETAILED DESCRIPTION OF THE INVENTION

The navy blue disazo dyes of the formula set forth above are prepared by diazotizing an aromatic amine of the formula

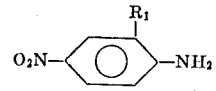

and coupling the diazo thus formed to α-naphthylamine. The monoazo intermediate thus formed is diazotized and coupled to an aromatic amine of the formula

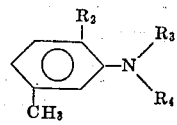

to produce the disazo dye. In the above formulas, all symbols are as previously defined. All diazotizations and couplings are carried out using conventional prior art procedures.

Diazotization of the first aromatic amine can be effected by adding sodium nitrite to a solution or slurry of the amine in dilute mineral acid, preferably hydrochloric acid, using at least 2.5 moles of acid per mole of amine, at 0–25° C. (preferably 10–20° C.). After maintaining an excess of nitrous acid for a sufficient length of time to ensure complete reaction, usually at least 30 minutes, the excess is destroyed with a suitable reagent such as sulfamic acid before proceeding with the coupling reaction. Examples of amines that can be employed in the diazotization reaction are given in Table 1. For simplicity, only $R_1$ (from the formula given above) is listed in the table.

TABLE 1

$R_1$:
 Cl
 Br
 $C_2H_5$
 $C_4H_9$ $R_1$:
 $OCH_3$
 $OC_4H_9$
 $COCH_3$
 $COC_4H_9$
 $COC_6H_5$

Amines with limited solubility in aqueous mineral acid, for example, when $R_1$ is $CO_2R_5$, may be diazotized by adding hydrochloric acid and sodium nitrite to a cooled solution of the amine in an organic solvent, such as a mixture of acetic and propionic acids. Other amines which are not sufficiently basic to dazotize conventionally, for example when $R_1$ is $NO_2$, $CF_3$ or $CN$, can be diazotized using nitrosylsulfuric acid.

The diazo preparation can be added to a stirred slurry or solution of an α-naphthylamine in dilute mineral acid and/or an organic solvent such as acetic acid or methanol at about 0–20° C. Alternatively, a slurry or solution of α-naphthylamine can be added to the diazo preparation. When the reaction is complete, the reaction mix is advantageously neutralized with caustic and the monoazo product is isolated by filtration. It can be purified, if desired, by washing, reslurrying or recrystallizing from a suitable solvent system.

The monoazo intermediate from above is conveniently diazotized in aqueous propionic or acetic acid, or mixtures thereof, by adding hydrochloric acid and sodium nitrite at 10–30° C., for example, at about 30° C.

The coupler is dissolved in a suitable solvent, for example, aqueous hydrochloric acid, aqueous acetic acid, acetic acid or acetone, and the disazo dye is prepared by adding the diazo preparation to the coupler, or the coupler to the diazo preparation, at about 10°–30° C. It is often desirable to raise the pH during coupling in order to increase the rate of reaction. This is done by adding a suitable salt or base, such as sodium acetate or sodium hydroxide. The resulting dyes are isolated by filtration and can be purified if necessary by washing or reslurrying or recrystallizing from a suitable solvent system. The disazo dye can be sand milled in water in the presence of a dispersing agent, such as sodium lignosulfonate, until a particle size of about 1 micron is obtained. Such prepared dispersions are employed in the dyeing experiments described hereinafter.

Examples of suitable couplers having the formula given above include those shown in Table 2. For simplicity, only $R_2$, $R_3$ and $R_4$ are listed in the table.

TABLE 2

| $R_2$: | $R_3$: | $R_4$: |
|---|---|---|
| $CH_3$ | $C_2H_5$ | $C_2H_5$ |
| $C_4H_9$ | $CH_3$ | $CH_3$ |
| $OCH_3$ | $CH_3$ | $CH_3$ |
| $OC_4H_9$ | $CH_3$ | $CH_3$ |

The method described above for preparing the dyes of this invention involves the isolation and reslurrying of the monoazo intermediate. If a solubilizing medium is provided, the isolation of the intermediate can be avoided. For example, the diazotization of the first aromatic amine can be carried out in an acetic acid/propionic acid mixture instead of in an aqueous system, the coupling with α-naphthylamine can be carried out in acetic acid, and the resulting slurry of monoazo intermediate can be treated directly with sodium nitrite, for example, at about 30° C., after which a solution of the coupler in a suitable solvent such as acetic acid is added. The disazo product dye is isolated in the usual manner.

The cellulosic materials which can be dyed with the dyes of this invention by the previously described Blackwell et al. process include all forms of cellulose which increase in size and in flexibility upon exposure to water. Suitable materials include natural fibers and purified wood pulps a swell as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with 10% aqueous caustic or the dyeing can be carried out in the presence of wetting agents, preferably of the nonionic type. Mixtures of cotton and rayon fibers can be dyed, and the present dyes also can be used to dye purified wood pulp and paper. Excluded herein as the water swellable cellulosic material is cellulose acetate which does not exhibit the requisite swellability in the presence of water.

The synthetic materials which can be dyed with the dyes of this invention include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol or aqueous dyeing procedures.

They can be applied to water swellable cellulosic materials, or to blends or mixtures thereof with synthetic materials by the above-described Blackwell et al. process. The dyes of this invention are particularly useful for dyeing mixtures and blends of cotton and polyester or polyamide, such as mixtures containing 50 to 80% polyethylene terephthalate and 20 to 50% cotton. In such mixtures, the synthetic material is dyed using conventional process conditions. Since the dyes of this invention can be used to dye both components in a blend or mixture, scourability as a factor in dye selection is avoided since the previously described cross-staining problem has been minimized.

The dyes of this invention dye the substrate directly, that is, they do not require oxidation, reduction, hydrolysis, or any other chemical modification for development of color or fastness. The dyes exhibit excellent fastness to light, sublimation, washing and drycleaning; they can be isolated in highly crystalline form and can be milled easily to finely divided aqueous dispersions.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye pad bath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dye bath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums, and wetting agents, examples of which are ionic and nonionic surfactants such as ethylene oxide condensation products, hydrocarbon sulfonates and long-chain alcohol sulfates. Dye baths used in practicing this invention also can contain dyes other than those of the invention; for example, direct dyes or fiber reactive dyes for cotton or for polyamides can be present for shading purposes.

In the preferred dyeing procedure with the dyes of this invention an aqueous dye dispersion and the organic solvent are applied to the fabric from a single pad bath. The amount of water in the pad bath usually is 70–95 weight percent and the solvent, 5–30 weight percent. The padded fabric is heated at 180–225° C. for 30–180 seconds. For cotton, temperatures as low as 150° C. usually are adequate. The dyed fabric is given an aqueous scour, or an aqueous scour followed by a perchloroethylene scour, to ensure complete removal of surface dye.

The following experiments show the utility of the dyes of this invention.

Dyeing 65/35 "Dacron" polyer/cotton blend fabrics (A) A pad bath was prepared from:

| | Grams |
|---|---|
| An aqueous dye paste (15% active ingredient) containing the dye of Example 1 | 100 |
| Purified vegetable gum thickener ("Superclear" 100N) | 20 |
| Methoxypolyethylene glycol(molecular weight 350) | 100 |
| Water to 1 liter. | |

A continuous length of 65/35 "Dacron" polyester/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., at 90–95° C. in water containing 1% of an ether-alcohol sulfate detergent, in water at 90–95° C., and in water at 20–30° C., and then dried.

(B) Experiment (A) was repeated except that the heating was carried out as follows. The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C. where the total contact time was about 90 seconds.

Experiments (A) and (B) were carried out using the dye of Example 1. The dye exhibited excellent tinctorial strength; dyed fabrics of a deep navy shade and having excellent levelness and balance were produced.

The following table lists fastness data which were obtained when the dyed fabrics (from Experiment (A)) were evaluated by means of standard tests described in the "Textile Manual of American Association of Textile Chemists and Colorists," vol. 45, 1969. The ratings considered for evaluation of test samples are the following:

5—negligible shade change
4—slight shade change
3—noticeable shade change
2—considerable shade change
1—much shade change
W—weaker
Br—brighter.

The first three columns of the table show the shade change of the dyed fabric. The next two show the degree of staining on an undyed acetate or nylon fabric. The last three columns show fastness to sublimation and crocking.

| Lightfastness (xenon arc) | | Washfastness (AATC 36-1965, No. III; 3 washes) | | | Sublimation, 410° F. | Crocking | |
|---|---|---|---|---|---|---|---|
| | | | Staining | | | | |
| 20 hrs. | 40 hrs. | Shade change | Acetate | Nylon | | Wet | Dry |
| 4W | 4–3W | 4 Br | 5 | 5–4 | 4–3 | 4–3 | 4–3 |

Dyeing cotton broadcloth (C) Experiment (A) was repeated except that a 100% mercerized cotton broadcloth was employed, the amount of glycol was increased to 150 grams, and the maximum temperature was reduced to about 180° C.

(D) Experiment (B) was repeated, employing the modifications recited in Experiment (C).

Printing of 100% cotton fabric (E) A cotton fabric was padded to about 70% pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

| | Grams |
|---|---|
| An aqueous navy blue dye paste (15% active ingredient) containing the dye of Example 1 | 10 |
| Purified natural gum ether thickener ("Polygum" 72) | 60 |
| Water | 30 |

The printed fabric was heated at 180° C. for 100 seconds, scoured in water containing an ether-alcohol sulfite detergent at about 90° C. for 5 minutes, dried, scoured in tetrachloroethylene at about 50° C. for 5 minutes and dried. The printed areas were strongly dyed.

Printing of 65/35 "Dacron" polyester/cotton blend fabric (F) Experiment (E) was repeated except that a 65/35 "Dacron" polyester/cotton fabric was employed and the maximum temperature was increased to 200° C. A print of good fastness was obtained.

Dyeing of polyester fibers

The dyes of this invention can be applied to synthetic fibers, for example, polyester fibers, by conventional aqueous or pad-heat procedures.

The following examples illustrate more clearly the preparation of the dyes of this invention. All parts are by weight.

EXAMPLE 1

Preparation of 1-amino-4-(4-nitrophenylazo)-naphthalene; coupling to N,N-diethyl-m-toluidine To 25 parts of water and 30 parts of concentrated hydrochloric acid were added 14 parts of p-nitroaniline. The mixture was heated to 80° C. until a clear solution was obtained. The solution was poured into a mixture of 40 parts of water and 40 parts of ice and then cooled further to 0–5° C. by external means. 28 parts of 5 N sodium nitrite solution were added rapidly and excess nitrite was maintained for 30 minutes. The excess was then destroyed with sulfamic acid and the diazo solution was clarified by filtration.

A solution of 15 parts of α-naphthylamine in 50 parts of acetic acid was then added over a period of 30 minutes to the cold diazo solution. The reaction mass became thick as coupling proceeded; it was diluted with 400 parts of water.

The pH was adjusted to 6.5 with 30% aqueous caustic soda, during which procedure the temperature rose to 40–50° C. The intermediate was isolated by filtration, washed thoroughly with water, and dried. Yield, 95%; melting point, 267–272° C.; $\lambda_{max.}$ dimethylacetamide: water=4:1), 540 m$\mu$; $\epsilon_{max.}$, 33,900 l./mole/cm.

The intermediate was shown by thin layer chromatograph (TLC) to contain no colored impurities.

15 parts of the above monoazo intermediate were slurried to a smooth paste in a warm mixture (50–60° C.) of 400 parts of acetic acid, 80 parts of water and 6 parts of concentrated hydrochloric acid. The temperature was then adjusted by external means to about 30° C. and 18 parts of 5 N-sodium nitrite solution were added over a 5 minute period. After maintaining an excess of nitrite for 45 minutes, the excess was destroyed with sulfamic acid. Ice was added to cool the diazo preparation to about 5° C., after which it was stirred at this temperature for 30 minutes and clarified by filtration.

A solution of 8.2 parts of N,N-diethyl-m-toluidine in 30 parts of acetic acid was then added to the diazo solution over a period of 20 minutes; the reaction was allowed to proceed until there was no longer any discernible diazonium salt in the reaction mixture. The pH was raised to about 2.5 and the slurry was stirred for ½ hour; the solids then were isolated by filtration and washed, first with isopropanol and then hot water. Yield, 80%. After recrystallization from dimethylformamide and water (3:1), the product had a melting point of 223–4° C.; $\lambda_{max.}$ dimethylacetamide:water=4:1), 595 m$\mu$; $\epsilon_{max.}$, 40,600 l./mol/cm.; $R_f$, 0.40 (TLC on silica gel-coated glass plates, using benzene:ethyl acetate=9:1 as eluent).

*Analysis.*—Calcd. for $C_{27}H_{26}O_2N_6$ (percent): C, 69.5; H, 5.6; N, 18.0. Found (percent): C, 68.9; H, 5.7; N, 18.2.

Based on the above, the dye had the structure

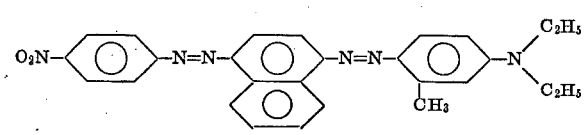

EXAMPLE 2

Synthesis of the dye of Example 1 without isolating the intermediate 14 parts of p-nitroaniline were dissolved in a mixture of 24 parts of concentrated hydrochloric acid, 20 parts of propionic acid and 125 parts of acetic acid by warming to about 70° C. The solution was then cooled externally to 0–5° C. and 30 parts of 5 N-sodium nitrite were added rapidly, holding the temperature at 8° C. or below by external cooling. Excess nitrite was maintained for ½ hour. The excess was then destroyed with sulfamic acid and the diazo solution was clarified by filtration. It was then diluted with 330 parts of acetic acid and a solution of 15 parts of α-naphthylamine in 50 parts of acetic acid was added over a ½ hour period, the temperature being allowed to rise to room temperature. The dark slurry was agitated for ½ hour at 25° C. and the temperature was then adjusted to about 30° C. 25 parts of 5 N-sodium nitrite solution were added over a period of 5 minutes. Excess nitrite was maintained for 1 hour at about 30° C., after which the excess was destroyed with sulfamic acid. 2 parts of "Darco" charcoal powder and 100 parts of ice were added and the temperature was adjusted to 5° C. After stirring for 15 minutes, the diazo preparation was clarified by filtration. A solution of 16.5 parts of N,N-diethyl-m-toluidine in 20 parts of acetic acid was added to the diazo preparation over a ½ hour period, after which the pH was adjusted to 2.5 with 30% aqueous caustic soda solution. The reaction mass was stirred for 1 hour at 25° C. and the dye was then filtered off and washed with hot water. Yield, 80%. The dye had the same structure as the dye product of Example 1.

EXAMPLES 3–5

Example 1 was repeated except that p-nitroaniline was replaced with an equivalent amount of o-chloro-p-nitroaniline. The corresponding chloro-substituted dye was obtained, exhibiting a $\lambda_{max.}$ of 605 m$\mu$. Similar dyes were obtained when p-nitroaniline was replaced with an equivalent amount of o-methoxy-p-nitroaniline and with an equivalent amount of o-benzoyl-p-nitroaniline. The dye product of Example 4 contained the 2-methoxy substituent, and the dye product of Example 5 contained the 2-benzoyl substituent, instead of the 2-chloro substituent (in Example 3).

EXAMPLE 6

Example 2 was repeated except that the p-nitroaniline was replaced with an equivalent amount of n-butyl 2-amino-5-nitrobenzoate. A navy blue dye was produced having the structure

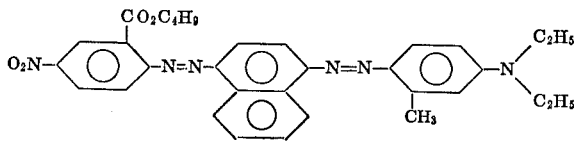

EXAMPLE 7

Preparation of 1-amino-4-(2,4-dinitrophenylazo)-naphthalene; coupling to N,N-diethyl-m-toluidine 8.4 parts of powdered sodium nitrite were added in small portions to 184 parts of 96% sulfuric acid at 25–30° C. The mixture was then heated carefully to 70° C. and held at this temperature until the solid dissolved. The solution was cooled to 20° C. and 18.3 parts of 2,4-dinitroaniline were added. The mixture was filtered.

The diazo solution was added over a period of ½ hour to a solution of 15 parts of αnaphthylamine in 50 parts of acetic acid. The pH was then adjusted to 6.5 with 30% aqueous caustic soda and the intermediate was collected by filtration, washed thoroughly with water and dried.

Coupling of the intermediate with N,N-diethyl-m-toluidine, using the procedure of Example 1, yielded the navy blue dye of the structure

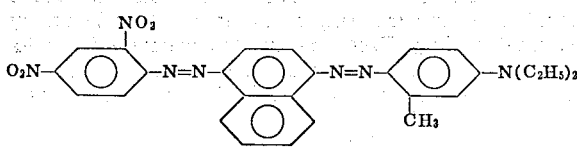

EXAMPLES 8-9

Example 7 was repeated except that the dinitroaniline was replaced with an equivalent amount of 2-cyano-4-nitroaniline and with an equivalent amount aof 2-trifluoromethyl-4-nitroaniline. Dyes similar to the dye product of Example 7 were obtained. The dye product of Example 8 contained the 2-cyano substituent and the dye product of Example 9 contained the 2-trifluoromethyl substituent, instead of the 2-nitro substituent (in Example 7).

The embodiments of the invention in which an exclusive property or privilege is claimed are defined as follows:

1. Navy blue disperse disazo dye of the formula

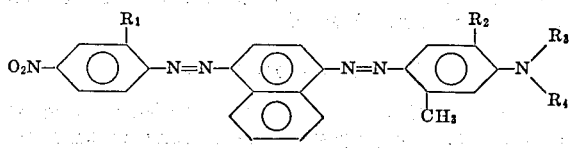

wherein
$R_1$ is H, $R_5$, $OR_5$, Cl, Br, $NO_2$, CN, $CO_2R_5$, $CF_2$, $COR_5$, or $COC_6H_5$,
$R_2$ is H, $R_5$ or $OR_5$,
$R_3$ and $R_4$ each is methyl or ethyl, and
$R_5$ is alkyl of 1–4 carbon atoms.

2. The dye of claim 1 wherein $R_1$ and $R_2$ are H and $R_3$ and $R_4$ are ethyl.

References Cited
UNITED STATES PATENTS

| | | | |
|---|---|---|---|
| 2,289,413 | 7/1942 | Ellis et al. | 260—187 X |
| 2,424,627 | 7/1944 | Olpin et al. | 260—186 |
| 3,293,240 | 12/1966 | Koike et al. | 260—191 X |

FOREIGN PATENTS

| | | | |
|---|---|---|---|
| 880,858 | 10/1961 | Great Britain | 260—187 |

LEWIS GOTTS, Primary Examiner

C. F. WARREN, Assistant Examiner

U.S. Cl. X.R.

8—41 C, 50, 51; 260—177, 185, 187